Jan. 27, 1959 J. W. PETERSON ET AL 2,871,044
ADJUSTABLE TELESCOPIC CONNECTION
Filed Oct. 4, 1957 2 Sheets-Sheet 1
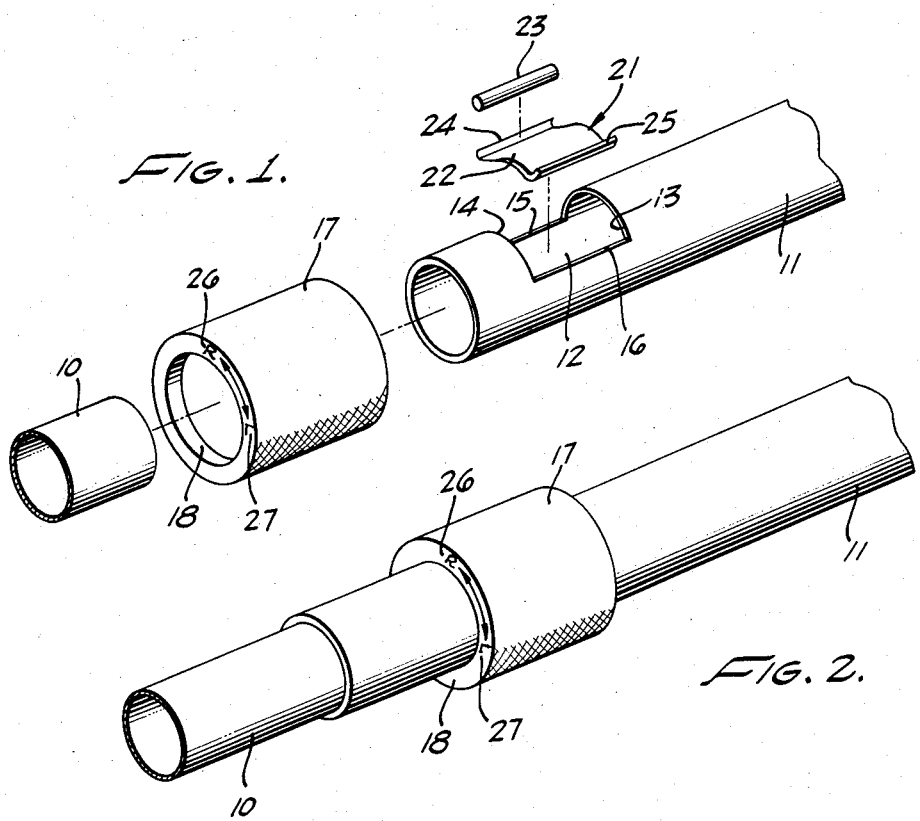
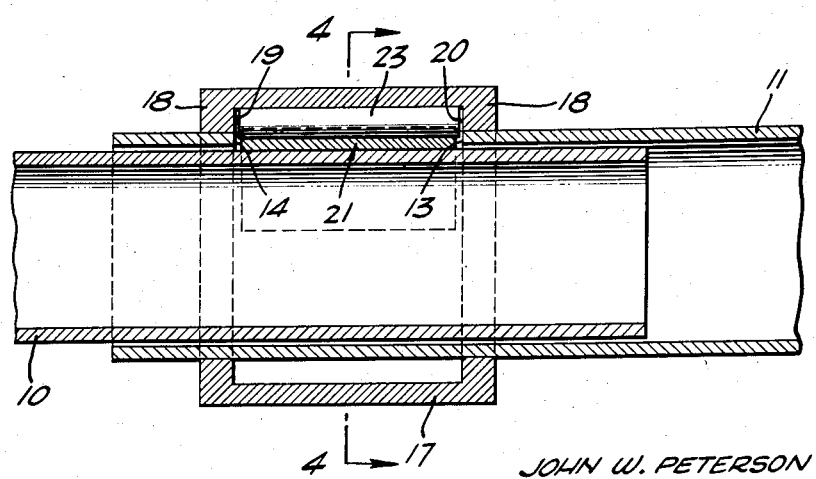
JOHN W. PETERSON
HARRY C. JENNINGS, JR.
INVENTORS
BY *Hazard & Miller*
ATTORNEYS Jan. 27, 1959  J. W. PETERSON ET AL  2,871,044
ADJUSTABLE TELESCOPIC CONNECTION
Filed Oct. 4, 1957  2 Sheets-Sheet 2

JOHN W. PETERSON
HARRY C. JENNINGS, JR.
INVENTORS

BY Hazard & Miller

ATTORNEYS

2,871,044
ADJUSTABLE TELESCOPIC CONNECTION

John W. Peterson and Harry C. Jennings, Jr., Los Angeles, Calif., assignors to Everest & Jennings, Inc., Los Angeles, Calif., a corporation of California Application October 4, 1957, Serial No. 688,234

7 Claims. (Cl. 287—58)

This invention relates to improvements in adjustable telescopic connections.

Explanatory of the present invention, there are many structures made up of two tubes that are telescopically arranged and wherein it is desirable to axially adjust one tube relatively to the other or to rotationally adjust one tube relatively to the other, or to effect an adjustment between the tubes which involves both an axial and rotational shifting of the position of one tube relatively to the other. Such constructions may exist in invalid wheel chairs, bed frames, supporting posts, and the like. It is desirable in effecting the adjustment to be able to quickly and easily loosen one tube relative to the other, shift it axially and/or rotationally, and then to easily and quickly clamp or lock the tubes in their adjusted positions so that they cannot be disturbed therefrom unless the connection is intentionally loosened for that purpose.

An object of the present invention is to provide an improved mechanism for releasably locking two telescopically arranged tubes in their adjusted positions so that on release of the tubes the desired adjustment may be effected and after the adjustment has been completed the tubes may be firmly locked in their adjusted positions.

With the foregoing and other objects in view, which will be made manifest in the following detailed description and specifically pointed out in the appended claims, reference is had to the accompanying drawings for an illustrative embodiment of the invention, wherein:

Figure 1 is an exploded view in perspective illustrating the parts of the improved adjustable connection;

Fig. 2 is a perspective view illustrating the connection in its assembled condition;

Fig. 3 is a longitudinal or axial section through the improved connection;

Figure 4:
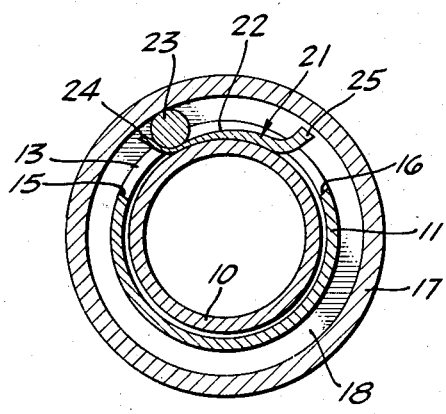
Fig. 4 is a transverse vertical section taken substantially upon the line 4—4 upon Fig. 3, in the direction indicated.

Referring to the accompanying drawings wherein similar reference characters designate similar parts throughout, portions of two tubes that are normally in telescopic arrangement and which it may be desired to adjust either axially or rotationally or both are illustrated at 10 and 11. In the illustration, 11 is the larger or outside tube and is designed to have the smaller or inside tube 10 inserted therein so as to bear a telescopic relationship thereto.

In accordance with the present invention, the outer tube 11 has an opening cut in its wall, indicated at 12, defined by opposed end edges 13 and 14 and side edges 15 and 16. A sleeve 17 surrounds the outer tube 11 in the vicinity of this opening. This sleeve is preferably externally knurled to facilitate its being gripped and rotated. It has inwardly extending flanges 18 at the ends thereof providing mutually opposed internal shoulders 19 and 20. A type of arcuate wedge member 21 is provided which is receivable in the opening 12 and is adapted to assume a position lying between the end edges 13 and 14 and fitting against the exterior of the inner tube 10. This arcuate wedge member presents a curved surface 22 which is eccentrically arranged with relation to the axis of the inner tubular member 10. A cylindrical roller 23 is provided which in length is approximately equal to the length of the opening 12 and the spacing between the opposed shoulders 19 and 20. This cylindrical roller occupies a position against the eccentric arcuate surface 22 partially between the end edges 13 and 14 and partially between the opposed shoulders 19 and 20. In the position shown in Fig. 4 wherein the roller is at the thin side of the arcuate wedge member 21, all parts of the construction are loose and in this position the tube 10 may be axially adjusted or rotationally adjusted with relation to the tube 11 or a combination of axial and rotational adjustments may be accomplished.

When the tube 10 has been adjusted to the desired position with respect to tube 11, the sleeve 17 can be rotated. The rotation of the sleeve causes the cylindrical roller 23 to rotate or roll sympathetically therewith and in so doing the roller rolls upwardly or outwardly, as viewed in Fig. 4, on the eccentric surface 22. This tends to crowd the sleeve as viewed in Fig. 4 upwardly and to force the inner tube as viewed in this figure downwardly so that ultimately the tube 10 is pressed against the interior of tube 11 with great force causing the tube 10 to be frictionally held or locked in the adjusted position relatively to the tube 11. If the sleeve 17 is reversely rotated the roller 23 rolls sympathetically therewith down the eccentric surface 22 or inwardly toward the axis of the tube 10. This effects a loosening of the parts so that tube 10 can be adjusted relative to the tube 11 either axially, rotationally or both.

The side edges of the wedge member 21 are bent outwardly, as at 24 and 25 limiting rolling movement of the roller 23 to some position on the eccentric surface 22. Ordinarily, unless the parts become severely worn, only the outwardly bent side edge 24 is utilized to confine the roller on this surface.

By virtue of the fact that the roller in all positions occupies a position partially between the edges 13 and 14 and partially between the opposed shoulders 19 and 20, the roller prevents axial displacement of the sleeve 17 with relation to the outer tube 11. In assembling the construction the wedge-shaped member 21 is inserted through the edge of tube 11 until it is opposite the opening 12. It is then moved outwardly into a position approximating the position shown in Fig. 4 within the opening. The roller 23 is then applied and the sleeve 17 is then axially slid onto the outer tube 11. An inward movement of both the wedge-shaped member and the roller 23 may be necessary while the sleeve is being slid axially onto the outer tube 11. However, when the opposed shoulders 19 and 20 are adjacent the end edges 13 and 14 the roller and wedge-shaped member may be caused to assume the position shown in Fig. 4.

While the parts are in this position the inner tube 10 is telescoped into the outer tube and assumes the position shown in Figs. 3 and 4. In order to indicate the direction in which the sleeve 17 must be rotated to effect a tightening or loosening of the connection the end of the sleeve may have suitable indicia applied thereto such as the letter R, indicated at 26, and the letter L, indicated at 27. Appropriate arrows may be associated with these letters indicating the direction required to rotate the sleeve to effect a release or to effect a locking up of the connection. The letters R and L indicate "release" and "lock" respectively.

It will be appreciated that when the parts are in the assembled condition a mere rotation of the sleeve 17 relative to the outer tube 11 will effect a release and when the parts are released the inner tube 10 may be adjusted relative to the outer tube. When it has reached its adjusted position reverse rotation of the sleeve 17 effects a quick and powerful lock between the tubes so that they cannot be readily disturbed without rotation the sleeve 17.

Figure 5:
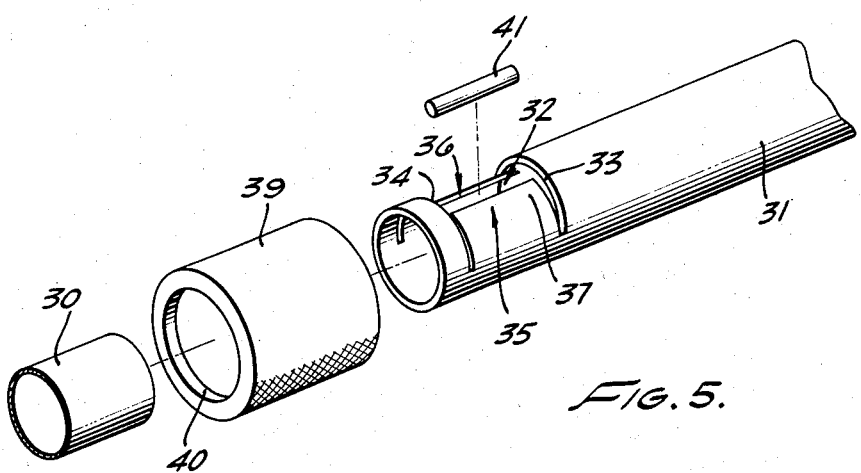
Fig. 5 is an exploded view of an alternative form of construction.
Figure 6:
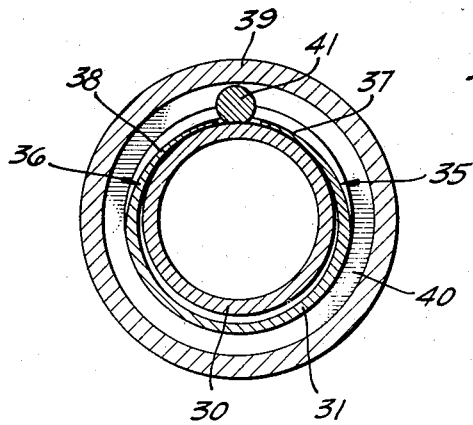
Fig. 6 is a sectional view similar to Fig. 4 through the connection illustrated in Fig. 5.

In Figs. 5 and 6 an alternative form of construction is disclosed wherein the inner tube is indicated at 30 and the outer tube is indicated at 31. Adjacent one end of the outer tube there is formed an opening 32 defined by end edges 33 and 34. At the sides of the opening there are circumferentially extending arcuate lips 35 and 36. These lips are thinned or tapered towards each other providing curved eccentric surfaces 37 and 38 that are eccentric with respect to the axis of the inner tube 30. In effect these lips provide opposed tapered wedges in the opening 32. The sleeve is indicated at 39 and has internal flanges 40 at its ends providing mutually opposed shoulders corresponding to the shoulders 19 and 20. In this form of construction a roller 41 is provided which is inserted through the end of the outer tube 31 and through the opening 32 between the ends of the opposed wedges 37 and 38. This roller occupies a position partially between the opposed shoulders provided by the internal flanges 40 and partially between the end edges 33 and 34 so as to lock the sleeve 39 against axial displacement relative to the outer tube 31. With the roller in applied position, as viewed in Fig. 6, the inner tube 30 may be telescoped into the outer tube 31 and moved to any desirable adjusted position with respect thereto. Then on rotation of the sleeve 39 the roller 41 will be caused to roll sympathetically therewith and climb one of the eccentric surfaces 37 or 38 to effect a tightening of the tubes in their adjusted positions. Rotation of the sleeve 39 in either direction will effect a tightening as the roller 41 will climb one of the wedge-shaped lips 35 and 36, depending upon the direction of rotation. Conversely, rotation of the sleeve 39 in the opposite direction from that in which it was rotated to tighten will effect a loosening. However, as it cannot be determined which direction the sleeve 39 was rotated to tighten, it frequently is unknown which direction the sleeve must be rotated to effect a loosening. For this reason we regard the construction illustrated in Figs. 1 to 4 as being preferable to the construction shown in Figs. 5 and 6. The construction shown in Figs. 5 and 6, however, possesses its advantages in that the wedges can be formed of the material of the tube itself and need not be formed of a separate piece.

Various changes may be made in the details of construction without departing from the spirit and scope of the invention as defined by the appended claims.

We claim:

1. In combination with two telescopically arranged members adapted to assume different axially adjusted positions with respect to each other, a sleeve presenting an inner surface concentric to the axes of said members rotatable about the outer of said members, a surface eccentric to the axis of the inner member disposed within the sleeve, and a roller interposed between said eccentric surface and the concentric surface on the interior of the sleeve whereby upon rotating the sleeve relatively to the outer member the roller turning sympathetically therewith will roll on said surface and ultimately cause the telescopic members to be frictionally held in adjusted position.

2. In combination with two telescopically arranged members adapted to assume different axially adjusted positions with respect to each other, a sleeve presenting an inner surface concentric to the axes of said members rotatable about the outer of said members, a surface eccentric to the axis of the inner member disposed within the sleeve, and a roller interposed between said eccentric surface and the concentric surface on the interior of the sleeve whereby upon rotating the sleeve relatively to the outer member the roller turning sympathetically therewith will roll on said surface and ultimately cause the telescopic members to be frictionally held in adjusted position, the outer member having an opening therein partially receiving the roller, and said sleeve having internal flanges at the ends thereof engageable with the ends of the roller.

3. In combination with two telescopically arranged tubes adapted to assume different axially and/or rotationally adjusted positions with respect to each other, a sleeve rotatable about the outer of said members presenting internal opposed shoulders at its ends, an opening in the outer of said tubes presenting edges at the ends thereof adjacent the shoulders of the sleeve, means providing a surface on the inner of the tubes between said edges which is eccentric to the axis of the inner tube, and a roller extending partially between said shoulders and partially between said edges adapted when the sleeve is rotated relatively to the outer tube to roll against said eccentric surface and frictionally lock the tubes against axial and/or rotational movement relative to each other.

4. In combination with two telescopically arranged tubes adapted to assume different axially and/or rotationally adjusted positions with respect to each other, a sleeve rotatable about the outer of said members presenting internal opposed shoulders at its ends, an opening in the outer of said tubes presenting edges at the ends thereof adjacent the shoulders of the sleeve, an arcuate wedge in said opening between said edges bearing against the inner tube, and a roller between said wedge and the sleeve adapted to be rolled by the sleeve on the wedge to a locking position frictionally locking the tubes against relative movement.

5. In combination with two telescopically arranged tubes adapted to assume different axially and/or rotationally adjusted positions with respect to each other, a sleeve rotatable about the outer of said members presenting internal opposed shoulders at its ends, an opening in the outer of said tubes presenting edges at the ends thereof adjacent the shoulders of the sleeve, an arcuate wedge in said opening between said edges bearing against the inner tube, and a roller between said wedge and the sleeve adapted to be rolled by the sleeve on the wedge to a locking position frictionally locking the tubes against relative movement, said roller being disposed partially between said shoulders and partially between said edges, and said wedge having shoulders at the sides thereof limiting the rolling of the roller on the wedge.

6. In combination with two telescopically arranged tubes adapted to assume different axially and/or rotationally adjusted positions with respect to each other, a sleeve rotatable about the outer of said members presenting internal opposed shoulders at its ends, an opening in the outer of said tubes presenting edges at the ends thereof adjacent the shoulders of the sleeves, a side of said opening having a tapering arcuate lip thereon providing an external surface eccentric to the axes of said tubes, and a roller within the sleeve adapted to be rolled by the sleeve on rotation thereof on said surface to lock the tubes against relative movement.

7. In combination with two telescopically arranged tubes adapted to assume different axially and/or rotationally adjusted positions with respect to each other, a sleeve rotatable about the outer of said members presenting internal opposed shoulders at its ends, an opening in the outer of said tubes presenting edges at the ends thereof adjacent the shoulders of the sleeves, the sides of said opening having tapering arcuate lips thereon providing external surfaces eccentric to the axes of said tubes, and a roller within the sleeve adapted to be rolled by the sleeve on rotation thereof on either of said surfaces to lock the tubes against relative movement.

References Cited in the file of this patent

UNITED STATES PATENTS

| | | |
|---|---|---|
| 1,055,606 | Cathcart | Mar. 11, 1913 |
| 2,470,256 | McIlroy | May 17, 1949 |
| 2,546,157 | Hume | Mar. 27, 1951 |
| 2,636,068 | Perkins | Apr. 21, 1953 |
| 2,818,280 | Budnik | Dec. 31, 1957 |